United States Patent
Bhasin

(10) Patent No.: US 10,017,398 B2
(45) Date of Patent: Jul. 10, 2018

(54) PROCESS TO RECOVER SOLUBLE CARBON AND NUTRIENTS FROM ORGANIC WASTE

(71) Applicant: RENEW TECHNOLOGIES LTD., Horsham (GB)

(72) Inventor: Charandeep Singh Bhasin, Budapest (HU)

(73) Assignee: RENEW TECHNOLOGIES LTD., Horsham (GB)

( * ) Notice: Subject to any disclaimer, the term of this patent is extended or adjusted under 35 U.S.C. 154(b) by 353 days.

(21) Appl. No.: 14/888,201

(22) PCT Filed: May 7, 2014

(86) PCT No.: PCT/HU2014/000041
§ 371 (c)(1),
(2) Date: Oct. 30, 2015

(87) PCT Pub. No.: WO2014/184595
PCT Pub. Date: Nov. 20, 2014

(65) Prior Publication Data
US 2016/0068407 A1    Mar. 10, 2016

(30) Foreign Application Priority Data
May 14, 2013    (HU) .................................... 1300309

(51) Int. Cl.
| | | |
|---|---|---|
| C02F 1/04 | (2006.01) | |
| C02F 1/66 | (2006.01) | |
| C02F 9/00 | (2006.01) | |
| C02F 11/18 | (2006.01) | |
| C02F 11/04 | (2006.01) | |
| C02F 103/32 | (2006.01) | |
| C02F 103/34 | (2006.01) | |

(52) U.S. Cl.
CPC ............... *C02F 1/041* (2013.01); *C02F 1/66* (2013.01); *C02F 9/00* (2013.01); *C02F 11/18* (2013.01); *C02F 11/04* (2013.01); *C02F 2103/32* (2013.01); *C02F 2103/34* (2013.01); *Y02E 50/343* (2013.01)

(58) Field of Classification Search
CPC .... C02F 1/04; C02F 1/041; C02F 1/66; C02F 9/00; C02F 11/04; C02F 11/18
See application file for complete search history.

(56) References Cited

U.S. PATENT DOCUMENTS

| | | |
|---|---|---|
| 4,085,044 A | 4/1978 | Komanowsky et al. |
| 4,462,976 A | 7/1984 | Karger |
| 6,139,747 A | 10/2000 | Rotzheim |
| 6,193,872 B1 | 2/2001 | Reason et al. |
| 2004/0115782 A1* | 6/2004 | Paterek ................. C02F 3/2853 435/168 |
| 2005/0016828 A1* | 1/2005 | Bednarek ............... B01D 1/221 203/1 |

FOREIGN PATENT DOCUMENTS

| | | |
|---|---|---|
| EP | 0176963 A2 | 4/1986 |
| EP | 0176963 A3 | 4/1986 |
| EP | 0286616 | 10/1988 |
| EP | 0838435 | 4/1998 |
| EP | 2366679 | 9/2011 |
| HU | 1200637 | 5/2014 |
| WO | WO200039036 | 10/2000 |
| WO | WO2005113445 | 12/2005 |
| WO | WO2009083985 | 7/2009 |
| WO | WO2011010275 | 1/2011 |

OTHER PUBLICATIONS

Standard methods for the examination of water and wastewater, American Public Health Association (APHA), American Water Works Association and Water Environment Federation 1992, 18th Edition.
Sludge test for the determination of volatile fatty acids, Hungarian Industry Standard No. MSZ 318/5-79, Hungarian Office for Standards, 1979 (in Hungarian, referenced in specification).
International Preliminary Report on Patentability for PCT/HU2014/000041 dated Sep. 28, 2015.

* cited by examiner

*Primary Examiner* — Jonathan Miller
(74) *Attorney, Agent, or Firm* — Pearl Cohen Zedek Latzer Baratz LLP

(57) ABSTRACT

The present invention relates to a process for separating short-chain fatty acids and nutrients from liquid organic waste produced after subjecting organic waste to hydrolysis and acidogenesis or to anaerobic digestion, wherein the process comprises:
  i. a step of adjusting the pH of the liquid organic waste to 1.9 to 2.1 by adding acid;
  ii. a step of subjecting the pH-adjusted liquid organic waste to vapor compression distillation in a distillation device producing a distillate and a residue
    while
      measuring the total dissolved solid, "TDS", concentration of the distillate and the residue in the distillation device and
      maintaining a distillate:residue ratio in the range between 85:15 v/v % and 95:5 v/v % by measuring the TDS concentration in the distillation device,
    until the TDS concentration of the residue in the distillation device reaches a value of 10 times that of the pH-adjusted liquid organic waste.

6 Claims, No Drawings

PROCESS TO RECOVER SOLUBLE CARBON AND NUTRIENTS FROM ORGANIC WASTE

CROSS-REFERENCE TO RELATED APPLICATIONS

This application is a National Phase Application of PCT International Application No. PCT/HU2014/000041, International Filing Date May 7, 2014, claiming priority of Hungarian Patent Application(s) No(s). P1300309, filed May 14, 2013, which are hereby incorporated by reference.

The present invention relates to a process for separating soluble carbon and mineral compounds containing nutrients from liquid organic waste gained after hydrolysis and acidogenesis or anaerobic digestion of organic waste such as wastewater sludge, food processing waste (animal, fruit and vegetable, diary, etc.), commercial waste (grease, expired food), agricultural waste, organic municipal solid waste, animal manure, industrial by-products like Category 2 and Category 3 waste as specified in the EU regulation No 1069/2009 or a mixture thereof.

More particularly, the present invention comprises a step where the liquid organic waste is subjected to pH adjustment and another step where distillation is used to separate the valuable components of the pH-adjusted liquid organic waste into a distillate comprising soluble carbon and a residue comprising nutrients.

In the current description we refer to the following definitions:

Organic Waste:
Type of waste, typically originating from plant or animal sources, which may be broken down by other living organisms in a reasonable amount of time into its base compounds; can be found in municipal solid waste as green waste, food waste, paper waste and biodegradable plastics; includes also human waste, manure, sewage and slaughterhouse waste, and digestate.

pH Adjustment (Acidification):
Addition of an acid to a substance such as liquid or vapor until the pH falls below 7.

Distillation:
Method of separating mixtures based on differences in boiling points (volatilities) of its components.

Soluble Carbon:
Contains organic carbon compounds and low molecular weight fatty acids with a carbon chain of six carbons or less (Formic C1; Acetic C2; Propionic C3; Butyric C4; Valeric C5; Caproic C6) which are also known as volatile fatty acids (VFA), short-chain fatty acids (SCFA) or carboxylic acids and result from fermentation or hydrolysis of organic waste.

sCOD:
Chemical oxygen demand of dissolved materials, expressed in mg/l.

Nutrients:
Any organic or inorganic material of natural or synthetic origin (other than liming materials) that is added to a soil to foster the growth of plants. Important nutrient elements as identified in EU regulation No 2003/2003 are:
primary nutrients: nitrogen, in the form of ammonium nitrogen (NH4-N) or nitrate nitrogen (NO3-N), phosphorous, in the form of phosphates (PO4-P), and potassium,
secondary nutrients: calcium, magnesium, sodium, sulfur and
micro-nutrients: boron, cobalt, copper, manganese, iron, molybdenum, zinc.

Liquid Organic Waste, Such as:
permeate
a liquid product gained after firstly subjecting organic waste to hydrolysis and acidogenesis and then secondly by separating the liquid part of the hydrolyzed organic waste from the solid one by membrane filtration; comprises soluble carbon and mineral compounds including valuable nutrients;
methanogenic digestate
a liquid byproduct gained after firstly subjecting organic waste to anaerobic digestion to produce biogas rich in methane and then secondly separating the undigested solids from the liquid; comprises most of the residual soluble carbon and mineral compounds including valuable nutrients.

Distillate:
A liquid condensed from vapor during distillation comprising soluble carbon.

Residue:
A matter left in a retort after evaporation or distillation comprising nutrients which might be used as fertilizers for plants after further treatment.

Total Dissolved Solid (TDS):
Combined measurement of all organic and inorganic compounds in a liquid after being filtered through a filter the pore size of 0.45 micrometer, measured in mg/l.

Vapor Compression Distillation (VCD):
Method for compressing and thus increasing the pressure of the vapor produced using a blower, compressor or (high pressure motive) steam ejector; combines the benefits of distillation with those of vapor compression to greatly lower the cost of distillation; if performed by a mechanically driven compressor or blower usually referred to as MVR (Mechanical Vapor Recompression), otherwise as Thermocompression or Steam Compression; MVR is used in large machines, especially when energy-efficiency is important.

Treatment of organic waste is a well-established field of research and development. In the last few years, research has focused more on trying to recover valuable matter from organic solids, e.g. compost fertilizer, biogas, nitrogen and phosphorus, as part of treating and managing organic solids.

It is known that measurement of organic acids is standardized by many authorities. The Hungarian Standard Method for examination of sludge (MSZ 318/5-1979) as well as Chapter 5560, "Standard Methods for the Examination of Water and Wastewater", American Public Health Association (1992) disclose an empirical method for determining the concentration of organic acids in wastewater or sludge using distillation and titration. The purpose of the method is to control the efficacy of anaerobic digestion. Separation of the organic part of wastewater/sludge from the inorganic one on industrial scale is not discussed therein. Furthermore, no teaching is given concerning the need for a certain distillate:residue ratio to increase the yield. pH adjustment of the sample is needed only when applying the chromatographic separation method.

It is also known from prior art that UTB Envirotec Zrt.'s Hungarian patent application No P1200637 discloses a method and apparatus for improving efficacy and yield of hydrolysis and acidogenesis of organic waste in a reactor by removing spent solids and a permeate comprising soluble carbon and nutrients from said reactor. The permeate is separated from the organic waste after hydrolysis and acidogenesis by means of filtration. However the recovered permeate is still waste being a liquid mixture of nutrients and soluble carbon that needs further treatment to be applicable in industry or agriculture.

It is further known that the international patent application No PCT/IL2009/000001 (WO2009083985) discloses a multistage process for treating organic waste by drying the sludge and mixing it with a solvent medium to prepare a slurry. This thermochemical liquefaction process happening at 275 to 375° C. and at a pressure of about 10 atm results in a liquid solid phase where the two separate liquid streams are oil and water. However, by subjecting the oil phase to vacuum distillation synthetic fuel is recovered instead of soluble carbon and nutrients separately.

European patent application No EP2366679A1 discloses a process for treating organic waste by means of denitrification and at the same time obtaining residues that can be used as agricultural fertilizer. Denitrification happens in the presence of a mixture comprising phosphorus pentoxide, potassium oxide, calcium oxide and magnesium oxide in the form of powder. The gaseous/vapor phase containing ammonia and the excess ammonia is taken away by evaporation or distillation. Disadvantages of the process are that (i) the only starting material useable is livestock effluent; a particular type of organic waste and (ii) the gained product is a mixture of all of the organic and inorganic parts of the livestock effluent and mineral oxides which are added in calculated quantity to make the product useful as fertilizer.

U.S. Pat. No. 6,193,872 B1 discloses a process and a plant to generate a solution of an alkali metal hydroxide from an alkaline aqueous inorganic waste stream, that contains C3 to C22 carboxylic acids in the form of alcohols, ethers, ketones and aldehydes, for recycling to a chemical production plant. The waste stream is first acidified to bring the pH to about 2 to about 3.5 and then subjected to distillation. Carboxylic acids gained as a by-product are purged without further utilization. In order to minimize corrosion of the electrolysis zone used to recover said solution it is desirable not to lower the pH too far below that corresponding to the pKa of the carboxylic acid.

The aim of the current invention is to increase the yield of soluble carbon and nutrients obtained by separation from a mixture thereof on industrial scale. The mixture might be a permeate gained as a liquid product after subjecting any kind of organic waste to hydrolysis and acidogenesis, or a methanogenic digestate produced as a liquid waste stream beside biogas in biogas plants by subjecting agricultural waste to anaerobic digestion.

It is sought to reach—after distillation—a distillate comprising more than 85 to 88 w/w % of the soluble carbon, less than 2 w/w % of ammonium nitrogen and less than 1 w/w % of phosphate.

The present invention solving this problem is a process for separating liquid organic waste, comprising soluble carbon and mineral compounds including nutrients, gained after subjecting organic waste to hydrolysis and acidogenesis or to anaerobic digestion where said process comprises
  i. a step of adjusting the pH of the liquid organic waste to 1.8 to 2.5 by adding acid;
  ii. a step of distilling the pH-adjusted liquid organic waste into
    a distillate comprising (in condensed water) at least 85 to 88 w/w % of soluble carbon, containing mainly volatile fatty acids, and less than 3 w/w % of nutrients comprising ammonium nitrogen and phosphates, and
    a residue comprising the nutrients not contained in the distillate
  while
    a distillate:residue ratio in the range between 85:15 v/v % and 95:5 v/v % is maintained.

The process according to the invention is suitable for any permeate or methanogenic digestate gained from organic waste such as wastewater sludge, food processing waste, commercial waste, agricultural waste, organic municipal solid waste, animal manure, industrial by-products like Category 2 and Category 3 waste according to EU regulation No 1069/2009, or a mixture thereof, preferably organic waste with a high content of carbohydrates, lipids and proteins.

The pH might be adjusted by adding acid continuously or batchwise to the liquid organic waste, under continuous stirring. The stirring
  homogenizes the acid and the liquid organic waste and thus prevents overacidification,
  lets the $CO_2$ escape thus allowing the carbonic acid to remain in the distillate,
  avoids overheating of the liquid organic waste caused by reaction heat.

Adding sulphuric and/or phosphoric acid to adjust the pH of the permeate is especially preferred.

Eventually the acid might be previously dilated with water in a 1:1 ratio to allow a more precise pH setting.

The amount of acid that needs to be added depends on the contents of the liquid organic waste—mainly by the volatile fatty acids and ammonium nitrogen contained therein—and on the pH value of the liquid organic waste.

To achieve the highest yield in soluble carbon (in the distillate) and in nutrients (in the residue) as much acid is added as needed to preferably set the pH to 1.9 to 2.1.

Adjusting the pH of the liquid organic waste
  enables soluble carbon to distillate out with the water steam at a lower temperature than the different volatile fatty acids would at their own individual boiling points,
  fixes the liquid organic waste's ammonium content in form of ammonium-sulphate (if sulphuric acid is used) and thus preventing the ammonium from becoming volatile.

The homogeneous mixture of the liquid organic waste and acid is then added to a distillation device wherein—depending on the device—a boiling pressure of 100 to 1000 mbar and a boiling temperature of 35 to 100° C. is maintained.

In a preferred embodiment of the invention distillation is done by means of vapor compression, optionally with polymeric heat exchangers due to the low level of pH causing corrosion. MVR compression is preferred.

Beside water the distillate gained comprises mainly soluble carbon and in traces nutrients. The residue comprises beside water mainly nutrients and the part of the soluble carbon which is not in the distillate.

In another preferred embodiment of the invention the distillation is continued until a distillate:residue ratio of about 90:10 v/v % (90 v/v % of distillate and 10 v/v % of residue) is reached. Measurement of the ratio is possible by measuring the TDS concentration of the liquid in the distillation device. If the TDS concentration is 10 times the concentration measured after pH adjustment of the liquid organic waste the desired ratio is reached. A 90:10 v/v % ratio ensures that the recovery of soluble carbon in the distillate is about 88 w/w % and the recovery of nutrients in the residue is about 98 w/w %.

Continuing the distillation process beyond a 95:5 v/v % ratio might cause the residue to burn up and thus to become unusable.

Distilling might be done continuously or semi-continuously.

The invented process has the following main advantages:
it offers a solution to further treat liquid organic waste gained from organic waste subjected to hydrolysis and acidogenesis, or optionally to anaerobic digestion.
it recovers by way of separation soluble carbon and nutrients where
  the soluble carbon is a valuable carbon source for use in an activated sludge plant, biofuel production, biogasification plants, bioplastics production, biorefineries for useful chemicals production, electricity production using microbial fuel cells, and other industrial uses where carboxylic acids can be applied;
  the recovered nutrients may be used as organic fertilizer after further treatment.

In the following examples are presented to show some details of the process according to the present invention without the intention of limitation.

EXAMPLES

In the examples below we use the following starting material and pH adjustment means:
starting material:
permeate gained by membrane filtration from waste activated sludge of a municipal wastewater plant after subjecting the sludge to hydrolysis and acidogenesis; temperature: 15 degree Celsius;
pH adjustment means:
open vessel having a pH sensor, an acid dispenser with a stirring device, and an inlet and outlet opening attached Example 1

At first we set the pH of the permeate to 2.0 by filling 300 liters of the permeate into a feed tank and adding 1 liter of concentrated sulfuric acid previously diluted with water in a ratio of 1:1, slowly for 1 hour, under continuous stirring using the acid dispenser with the stirring device. The mixture obtained is a homogenous, almost $CO_2$-less liquid wherein the ammonium is bound as protonated non-volatile ammonium sulphate and the TDS concentration is 0.65 w/w %.

Then we feed the liquid continuously into a mobile evaporator having an evaporation capacity of 50 to 100 kg/h and a boiling temperature control of 35 to 100 degree Celsius using vacuum principle. The liquid is then circulated by a pump and heated and boiled inside a plate heat exchanger. Next we flash the liquid into a vessel, separating the liquid and the vapor. The clean vapor goes into a MVR compressor where it is compressed to a higher temperature and pressure before condensing in the heat exchanger.

Besides maintaining a boiling pressure of 170 to 220 mbar and a boiling temperature of 57 to 62 degree Celsius the distillate is continuously produced and discharged into an empty vessel at a flow rate of 70 to 90 l/h. The residue is left in the evaporator for about 3 hours from start till the TDS in the liquid reaches a concentration of 6.5 w/w %, indicating that the distillate:residue ratio is about 90:10 v/v %. Discharging of the residue is then started and manually adjusted in order to keep the TDS concentration at 6.5 w/w %. After 4 hours 271.8 liters of distillate (see Table 1) and 30.2 liters of residue are obtained.

Table 1 shows the characteristics of the distillate obtained under industrial scale conditions as described in Example 1:

TABLE 1

Industrial scale distillate

| | Original permeate | Distillate | Compounds of distillate (w/w %) |
|---|---|---|---|
| sCOD (mg/l) | 5340 | 5200 | 87.64 |
| NH4-N (mg/l) | 1000 | 17 | 1.53 |
| ortho PO4-P (mg/l) | 50 | 0.5 | 0.9 |
| Conductivity (µS/cm) | 12300 | 480 | — |

In Examples 2-5 below tests are run batchwise under laboratory conditions using a normal laboratory distillator with a boiling point of 100 degree Celsius under atmospheric pressure.

Example 2

At first we add 100 ml of distilled water to 100 ml of permeate having a pH of 7.83. The pH remains unchanged (in the following referred to as Sample 1). After distillation a distillate of 177 ml has been obtained. The distillate recovery rate is 88.41 v/v %.

Example 3

At first we add 2.6 ml of sulphuric acid diluted in a 1:1 ratio (with distilled water) to 100 ml of permeate having a pH of 7.83. This sets the pH to 1.97 (in the following referred to as Sample 2). After distillation a distillate of 94 ml has been obtained. The distillate recovery rate is 91.62 v/v %.

Example 4

At first we add 100 ml of distilled water and 2.6 ml of sulphuric acid diluted with distilled water in a 1:1 ratio to 100 ml of permeate having a pH of 7.83. This sets the pH to 2.63 (in the following referred to as Sample 3). After distillation a distillate of 184 ml has been obtained. The distillate recovery rate is 90.9 v/v %.

Table 2 below shows the characteristics of the distillate obtained from Samples 1-3:

TABLE 2

Dependency on pH adjustment

| Measured components | Units | Starting material | Distillate of Sample 1 | Distillate of Sample 2 | Distillate of Sample 3 |
|---|---|---|---|---|---|
| Distillate ratio | v/v % | — | 88.5 | 91.62 | 90.9 |
| Conductivity | µS/cm | 9750 | 1442 | 677 | 1640 |
| Soluble carbon as sCOD (recovery in w/w %) | mg/sample w/w % | 970 — | 424 43.71 | 852 87.83 | 515 53.1 |
| C2 | mg/l | 1040 | 416 | 852 | 515 |
| C3 | mg/l | 1131 | 456 | 1061 | 636 |
| iC4 | mg/l | 203 | 88 | 191 | 104 |
| nC4 | mg/l | 110 | 67 | 109 | 74 |
| iC5 | mg/l | 455 | 202 | 424 | 217 |
| nC5 | mg/l | 167 | 93 | 165 | 98 |
| iC6 | mg/l | 40 | 42 | 44 | 42 |
| nC6 | mg/l | 52 | 48 | 50 | 48 |
| nC7 | mg/l | 80 | 78 | 80 | 78 |

TABLE 2-continued

Dependency on pH adjustment

| Measured components | Units | Starting material | Distillate of Sample 1 | Distillate of Sample 2 | Distillate of Sample 3 |
|---|---|---|---|---|---|
| ortho PO4-P (recovery in w/w %) | mg/sample w/w % | 11 — | 0.35 3.22 | 0.02 0.18 | 0.1 0.9 |
| NH4-N (recovery in w/w %) | mg/sample w/w % | 133.3 — | 42.48 31.86 | 0.18 0.13 | 1.0 0.75 |

It can be seen from Table 2 that the recovery of soluble carbon in the distillate is the highest in Sample 2 (sCOD=87.83 w/w %) where the pH was adjusted close to 2. Acidifying the permeate not close to a pH of 2.0 results in a much lower soluble carbon recovery (43.71 w/w % in Sample 1 and 53.09 w/w % in Sample 3, respectively).

Example 5

At first we add 100 ml of distilled water and 1.0 ml of sulphuric acid diluted with distilled water in a 1:1 ratio to 100 ml of permeate having a pH of 7.77. This sets the pH to 2.00 (in the following referred to as Sample 4). After distillation a distillate of 155 ml has been obtained.

Table 3 below shows the characteristics of the distillate and residue gained after subjecting the permeate having a pH of 7.77 to pH adjustment and distillation as described in Example 5:

TABLE 3

Dependency on distillate recovery

| Measured components | Units | Starting material | Distillate of Sample 4 | Residue of Sample 4 |
|---|---|---|---|---|
| pH | — | 7.77 | 2.98 | 1.94 |
| Conductivity | µS/cm | 6860 | 394 | 40000 |
| Soluble carbon as sCOD | mg/sample w/w % | 1266 — | 946 74.72 | 299 23.62 |
| C2 | mg/l | 1745 | 1860 | 2421 |
| C3 | mg/l | 777 | 487 | 840 |
| iC4 | mg/l | 231 | 33 | 180 |
| nC4 | mg/l | 203 | 59 | 187 |
| iC5 | mg/l | 507 | 31 | 383 |
| nC5 | mg/l | 141 | 26 | 187 |
| iC6 | mg/l | 42 | 39 | 41 |
| nC6 | mg/l | 55 | 46 | 49 |
| nC7 | mg/l | 80 | 78 | 79 |
| ortho PO4-P | mg/sample w/w % | 5 — | 0.05 1 | 4.3 86 |
| NH4-N | mg/sample w/w % | 157 — | 2 1.27 | 131 83.44 |
| Distillate:residue recovery ratio | v/v % | — | 77.11 | 21.9 |

It can be seen that the nutrients recovery (86 w/w % of ortho PO4-P and 83.44 w/w % of NH4-N) in Sample 4 of the residue reached a level of interest while the recovery of soluble carbon was only 74.72 w/w % and the distillate:residue recovery ratio 77.1:21.9 v/v %.

Comparing Samples 1-4 it can be seen that the recovery of soluble carbon in the distillate is the highest in Sample 2, namely 87.83 w/w %. The distillate of the same sample contains also nutrients (0.31 w/w %) and the distillate:residue recovery rate is 91.62:8.38 v/v %.

The invention claimed is:

1. A process for separating liquid organic waste, produced after subjecting an organic waste to hydrolysis and acidogenesis or to anaerobic digestion,
where said liquid organic waste comprises
  a) soluble carbon comprising low molecular weight fatty acids with a carbon chain of six carbons or less, and
  b) nutrients comprising nitrogen in the form of ammonium nitrogen or nitrate nitrogen; phosphorus in the form of phosphates; and potassium, calcium, magnesium, sodium, sulfur, boron, cobalt, copper, manganese, iron, molybdenum or zinc,
further comprising:
  i) a step of adjusting the pH of the liquid organic waste to 1.9 to 2.1 by adding acid to produce pH adjusted liquid organic waste;
  ii) a step of subjecting the pH adjusted liquid organic waste to vapor compression distillation in a distillation device to produce a distillate and a residue while measuring the total dissolved solid, ("TDS"), concentration of the residue in the distillation device, and maintaining a distillate:residue ratio in the range between 85:15 and 95:5 v/v % by measuring the TDS concentration in the distillation device, until the TDS concentration of the residue in the distillation device reaches a value of 10 times that of the pH adjusted liquid organic waste.

2. The process according to claim 1 wherein in step i. the acid is added continuously or batchwise to adjust the pH.

3. The process according to claim 1 wherein in step i) sulphuric and/or phosphoric acid is added.

4. The process according to claim 1 wherein in step ii) the pH adjusted liquid organic waste is distilled using vapor compression with polymeric heat exchangers.

5. The process according to claim 1 wherein the distillation is done continuously or semi-continuously.

6. The process according to claim 1 wherein the liquid organic waste is a permeate or a digestate produced from wastewater sludge, food processing waste, commercial waste, agricultural waste, organic municipal solid waste, animal manure, or a mixture thereof.

* * * * *